(12) United States Patent
Payson

(10) Patent No.: US 7,515,637 B2
(45) Date of Patent: Apr. 7, 2009

(54) VIDEO DECODING FOR MOTION COMPENSATION WITH WEIGHTED PREDICTION

(75) Inventor: Christopher Payson, Bolton, MA (US)

(73) Assignee: Broadcom Advanced Compression Group, LLC, Andover, MA (US)

( * ) Notice: Subject to any disclaimer, the term of this patent is extended or adjusted under 35 U.S.C. 154(b) by 982 days.

(21) Appl. No.: 10/974,179

(22) Filed: Oct. 27, 2004

(65) Prior Publication Data

US 2005/0259736 A1   Nov. 24, 2005

Related U.S. Application Data

(60) Provisional application No. 60/573,547, filed on May 21, 2004.

(51) Int. Cl.
*H04N 7/12* (2006.01)

(52) U.S. Cl. ............. 375/240.16; 375/240; 375/240.01; 375/240.12

(58) Field of Classification Search ................. 375/240, 375/240.01, 240.03, 240.12, 240.16, 240.26
See application file for complete search history.

(56) References Cited

U.S. PATENT DOCUMENTS 6,526,099 B1 *   2/2003   Christopoulos et al.   375/240.26
2005/0175091 A1 *   8/2005   Puri et al. ............... 375/240.03

* cited by examiner

*Primary Examiner*—Allen Wong
(74) *Attorney, Agent, or Firm*—McAndrews, Held & Malloy, Ltd.

(57) ABSTRACT

Methods and systems for processing pixels within an encoded video stream are disclosed herein. Aspects of the method may comprise acquiring on a chip, a prediction weight type from the encoded video stream. Prediction weight data for at least one prediction pixel within the encoded video stream may be acquired based on the prediction weight type. A look-up table entry in a look-up table may be generated for the prediction pixel utilizing the prediction weight data. A plurality of current pixels within the encoded video stream may be estimated utilizing the look-up table entry. The prediction weight type may correspond to a plurality of reference pictures within the encoded video stream. A prediction weight value, offset value and motion vector data for the prediction pixel may be acquired on the chip, if the prediction weight type comprises an explicit prediction weight type.

39 Claims, 6 Drawing Sheets

| | 0 Column | 1 Column |
|---|---|---|
| 1 | $W_{(0;1)Y}$; $W_{(0;1)U}$; $W_{(0;1)V}$ <br> $S_{(0;1)Y}$; $S_{(0;1)U}$; $S_{(0;1)V}$ | $W_{(1;1)Y}$; $W_{(1;1)U}$; $W_{(1;1)V}$ <br> $S_{(1;1)Y}$; $S_{(1;1)U}$; $S_{(1;1)V}$ |
| 2 | $W_{(0;2)Y}$; $W_{(0;2)U}$; $W_{(0;2)V}$ <br> $S_{(0;2)Y}$; $S_{(0;2)U}$; $S_{(0;2)V}$ | $W_{(1;2)Y}$; $W_{(1;2)U}$; $W_{(1;2)V}$ <br> $S_{(1;2)Y}$; $S_{(1;2)U}$; $S_{(1;2)V}$ |
| 3 | $W_{(0;3)Y}$; $W_{(0;3)U}$; $W_{(0;3)V}$ <br> $S_{(0;3)Y}$; $S_{(0;3)U}$; $S_{(0;3)V}$ | $W_{(1;3)Y}$; $W_{(1;3)U}$; $W_{(1;3)V}$ <br> $S_{(1;3)Y}$; $S_{(1;3)U}$; $S_{(1;3)V}$ |
| 4 | $W_{(0;4)Y}$; $W_{(0;4)U}$; $W_{(0;4)V}$ <br> $S_{(0;4)Y}$; $S_{(0;4)U}$; $S_{(0;4)V}$ | $W_{(1;4)Y}$; $W_{(1;4)U}$; $W_{(1;4)V}$ <br> $S_{(1;4)Y}$; $S_{(1;4)U}$; $S_{(1;4)V}$ |
| 5 | $W_{(0;5)Y}$; $W_{(0;5)U}$; $W_{(0;5)V}$ <br> $S_{(0;5)Y}$; $S_{(0;5)U}$; $S_{(0;5)V}$ | $W_{(1;5)Y}$; $W_{(1;5)U}$; $W_{(1;5)V}$ <br> $S_{(1;5)Y}$; $S_{(1;5)U}$; $S_{(1;5)V}$ |
| 6 | $W_{(0;6)Y}$; $W_{(0;6)U}$; $W_{(0;6)V}$ <br> $S_{(0;6)Y}$; $S_{(0;6)U}$; $S_{(0;6)V}$ | $W_{(1;6)Y}$; $W_{(1;6)U}$; $W_{(1;6)V}$ <br> $S_{(1;6)Y}$; $S_{(1;6)U}$; $S_{(1;6)V}$ |
| 7 | $W_{(0;7)Y}$; $W_{(0;7)U}$; $W_{(0;7)V}$ <br> $S_{(0;7)Y}$; $S_{(0;7)U}$; $S_{(0;7)V}$ | $W_{(1;7)Y}$; $W_{(1;7)U}$; $W_{(1;7)V}$ <br> $S_{(1;7)Y}$; $S_{(1;7)U}$; $S_{(1;7)V}$ |
| | ⋯ | |
| 32 | $W_{(0;32)Y}$; $W_{(0;32)U}$; $W_{(0;32)V}$ <br> $S_{(0;32)Y}$; $S_{(0;32)U}$; $S_{(0;32)V}$ | $W_{(1;32)Y}$; $W_{(1;32)U}$; $W_{(1;32)V}$ <br> $S_{(1;32)Y}$; $S_{(1;32)U}$; $S_{(1;32)V}$ |

|  | 0 Column | 1 Column |  |
|---|---|---|---|
| 0:2 | $W_{(0;1)}$ | $W_{(1;1)}$ | 2:0 |
| 1:2 | $W_{(0;2)}$ | $W_{(1;2)}$ | 2:1 |
| 2:3 | $W_{(0;3)}$ | $W_{(1;3)}$ | 3:2 |
| 2:4 | $W_{(0;4)}$ | $W_{(1;4)}$ | 4:2 |

. . .

| 2:(n-1) | $W_{(0;n-1)}$ | $W_{(1;n-1)}$ | (n-1):2 |

FIG. 3

VIDEO DECODING FOR MOTION COMPENSATION WITH WEIGHTED PREDICTION

RELATED APPLICATIONS

This application makes reference to, claims priority to, and claims the benefit of U.S. Provisional Patent Application No. 60/573,547, filed on May 21, 2004 and entitled "Video Decoding For Motion Compensation With Weighted Prediction," the complete subject matter of which is hereby incorporated herein by reference in its entirety.

This application is related to the following applications, each of which is incorporated herein by reference in its entirety for all purposes:
U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

During video encoding, an exemplary video stream may be encoded on a frame-by-frame basis, and each frame may be encoded on a macroblock-by-macroblock basis. The MPEG-4 video compression standard may be utilized to encode video information on a macroblock-by-macroblock basis. For example, the MPEG-4 standard specifies the use of spatial prediction, temporal prediction, discrete cosine transformation (DCT), interlaced coding, and lossless entropy coding to compress macroblocks within a video stream. Spatial prediction techniques may be utilized during decoding to estimate pixels based on neighboring pixels. For example, pixels in a current macroblock may be estimated utilizing spatial prediction from pixels within a neighboring macroblock to the top and/or to the left of the current macroblock. Temporal prediction techniques may also be utilized during decoding of an elementary video stream to estimate pixels in a current macroblock based on pixels in different previous or subsequent frames and/or reference pictures.

During decoding of temporally predicted video information, explicit and/or implicit prediction data may be utilized to decode temporally predicted pixels within an elementary video stream. A conventional decoder utilizes separate hardware blocks, including separate memories, to implement temporal prediction of video information based on explicit and implicit prediction data. In addition, explicit prediction data, which may be encoded directly in the elementary video stream, may be acquired from the video stream and communicated to different processing blocks within the decoder for further processing. The utilization of separate hardware processing blocks within a conventional decoder to acquire or generate prediction data and process the acquired or generated prediction data separately to predict each encoded pixel, results in a significant increase in the processing time necessary for decoding an elementary video stream and, therefore, a decrease in the efficiency of the video decoder.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing pixels within an encoded video stream. Aspects of the method may comprise acquiring on a chip, a prediction weight type from the encoded video stream. Prediction weight data for at least one prediction pixel within the encoded video stream may be acquired based on the prediction weight type. A look-up table entry in a look-up table may be generated for the prediction pixel utilizing the prediction weight data. A plurality of current pixels within the encoded video stream may be estimated utilizing the look-up table entry. The prediction weight type may correspond to a plurality of reference pictures within the encoded video stream.

A prediction weight value, offset value and motion vector data for the prediction pixel may be acquired on the chip, if the prediction weight type comprises an explicit prediction weight type. The look-up table entry may be generated on the chip utilizing the prediction weight value and offset value for the prediction pixel. The generated look-up table entry may correspond to a luminance and/or chrominance components of the prediction pixel. The look-up table entry may be indexed utilizing the motion vector data. The current pixels may be estimated utilizing the indexed look-up table entry. The acquired motion vector data, prediction weight value and offset value may be stripped off from the encoded video stream.

If the prediction weight type comprises an implicit prediction weight type, motion vector data for the prediction pixel may be acquired. A prediction weight value for the prediction pixel may then be generated, where the prediction weight value may be based on a temporal distance between pixels within the encoded video stream. The look-up table entry may be generated on the chip utilizing the prediction weight value. The current pixels may be estimated utilizing the generated look-up table entry.

Another aspect of the method may comprise receiving the encoded video stream and acquiring prediction data from the received encoded video stream. A table may be generated during the acquiring of the prediction data based on the acquired prediction data for estimating a current pixel based on a previous pixel and a subsequent pixel. The generated table may be updated for a plurality of frames. If the acquired data comprises explicit prediction data, prediction weight information, offset and motion vector information may be acquired from the encoded video stream. If the acquired data comprises implicit prediction data, motion vector information may be acquired from the encoded video stream. Prediction weight information corresponding to the acquired motion vector information may be generated based on temporal distances between pixels in a current frame and a reference frame.

Another embodiment of the invention may provide a machine-readable storage, having stored thereon, a computer program having at least one code section executable by a machine, thereby causing the machine to perform the steps as described above for processing pixels within an encoded video stream.

Aspects of the system may comprise at least one processor that acquires on a chip, prediction weight type from encoded video stream. Prediction weight data for a prediction pixel within the encoded video stream may be acquired by the processor based on the prediction weight type. A look-up table entry in a look-up table may be generated by the processor for the prediction pixel utilizing the prediction weight data. A current pixel within the encoded video stream may be estimated by the processor utilizing the look-up table entry. The prediction weight type may correspond to a plurality of reference pictures within the encoded video stream.

If the prediction weight type comprises an explicit prediction weight type, the processor may acquire a prediction weight value, an offset value and motion vector data for the prediction pixel. The look-up table entry may be generated by the processor utilizing the prediction weight value and offset value for the prediction pixel. The generated look-up table entry may correspond to luminance and/or chrominance components of the prediction pixel. The processor may index the look-up table entry utilizing the motion vector data and may estimate the current pixels utilizing the indexed look-up table entry. The motion vector data, prediction weight value and offset value may be stripped off by the processor from the encoded video stream.

If the prediction weight type comprises an implicit prediction weight type, motion vector data for the prediction pixel may be acquired by the processor. A prediction weight value for the prediction pixel may be generated by the processor and the prediction weight value may be based on a temporal distance between plurality of pixels within the encoded video stream. The processor may generate the look-up table entry utilizing the prediction weight value and may estimate the current pixels utilizing the generated look-up table entry.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 2 is a diagram illustrating an exemplary explicit prediction weighting table, in accordance with an embodiment of the invention.

FIG. 3 is a diagram illustrating an exemplary implicit prediction weighting table, in accordance with an embodiment of the invention.

DETAILED DESCRIPTION OF THE INVENTION

Figure 1:
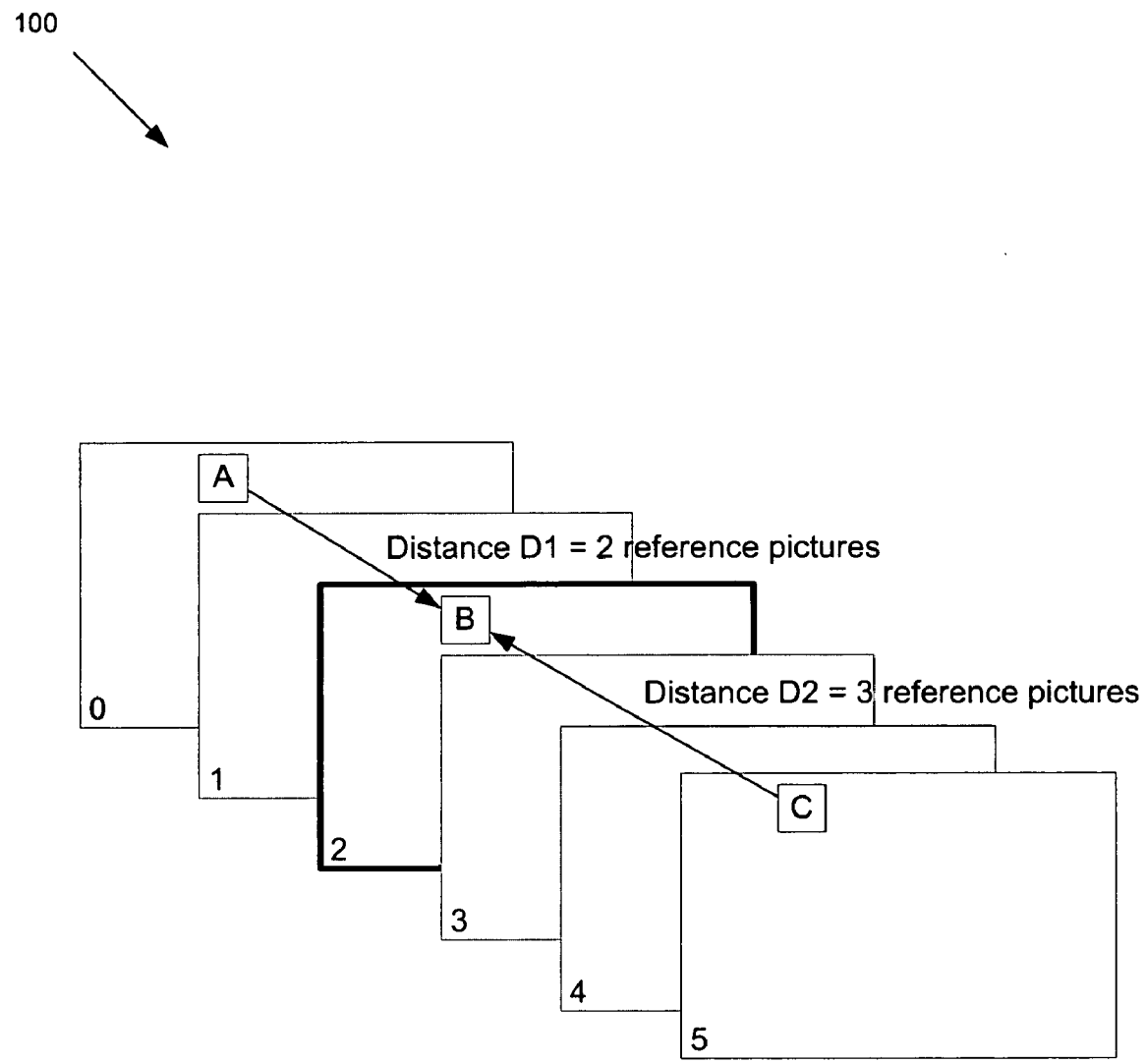
FIG. 1 is a block diagram of an exemplary weighted video processing scenario, in accordance with an embodiment of the invention.

Certain aspects of the invention may be found in a method and system for processing pixels within an encoded video stream. During encoding of a video stream, prediction information may be encoded within the elementary video stream. For example, for explicitly encoded prediction information, motion vector information associated with one or more reference pictures may be encoded within the elementary video stream, together with prediction weighting information and/or offset information. For implicitly encoded video information, motion vector information may be encoded within the elementary video stream and additional prediction information may be generated utilizing the motion vector information. In one aspect of the invention, a single memory may be utilized to handle both explicit and implicit prediction information during decoding.

For example, an implicit prediction weighting look-up table may be generated utilizing motion vector information obtained from the video stream. The implicit prediction weighting look-up table may comprise prediction weights for a plurality of reference pictures. Similarly, explicitly encoded prediction information may be extracted from the elementary video stream and a look-up table may be generated with corresponding prediction weight and offset information for a plurality of reference pictures used for decoding pixels within a current frame. After the look-up table is generated, the explicit prediction information may be removed from the elementary video stream to improve data flow and overall processing speed within the video decoder.

In MPEG-4 video decoding, a partition may be predicted from blocks of pixels P in more than one field/frame. For bi-directionally coded bitstream, a partition may be predicted from two weighted blocks of pixels, $P_0$ and $P_1$, for example. Accordingly, a prediction error E may be calculated as the difference between the weighted average of the prediction blocks $W_0P_0+W_1P_1$ and the partition. The prediction error E and an identification of the prediction blocks $P_0$, $P_1$ may be encoded within the elementary video stream. The prediction blocks $P_0$ and $P_1$ may be identified by motion vectors MV. Prediction weights, or weighting factors, $W_0$ and $W_1$ may, for example, be encoded explicitly in the elementary video stream, or implied from an identification of the field(s)/frame(s) containing the prediction blocks $P_0$ and $P_1$ from a corresponding motion vector. The prediction factors $W_0$ and $W_1$ may, for example, be implied from a temporal distance between the frames/fields containing the prediction blocks $P_0$ and $P_1$ and the frame/field containing the partition. In an exemplary scenario, where $T_0$ is the number of frame/field durations between the frame/field containing $P_0$ and the frame/field containing the partition, and $T_1$ is the number of frame/field durations for $P_1$, the weighting factors may be determined as follows: $W_0=1-T_0/(T_0+T_1)$ and $W_1=1-T_1/(T_{0+T1})$. More detailed information on bi-directional coding may be found in U.S. patent application Ser. No. 10/963,677, filed Oct. 13, 2004, the subject matter of which is hereby incorporated by reference in its entirety.

FIG. 1 is a block diagram 100 of an exemplary weighted video processing scenario, in accordance with an embodiment of the invention. Referring to FIG. 1, there is illustrated a weighted prediction scenario of pixels within a current macroblock B in a current reference picture 2 utilizing prediction pixels in macroblocks A and C in a corresponding previous reference picture 0 and a subsequent reference picture 5, respectively.

Weighting prediction to obtain pixels within the current macroblock B may be a function of temporal distance between the current reference picture 2 and one or more previous or subsequent reference pictures. For example, in the exemplary two-reference scenario of FIG. 1, weighting may be a function of respective temporal distances between macroblocks A and C in reference pictures 0 and 5 and the current macroblock B in reference picture 2. In one aspect of the invention, weighting may be a function of a first temporal distance $D_1$ between the first reference picture 0 and the current picture 2, and a second temporal distance $D_2$ between the second reference picture 5 and the current picture 2. In this manner, a first weighting factor $W_1$ may be a function of $D_2/(D_1+D_2)$, and a second weighting factor $W_2$ may be a function of $D_1/(D_1+D_2)$. Even though the present invention contemplates the use of two references, the invention is not limited to a two-reference scenario or characteristics thereof. In addition, the invention is not limited to the use of a reference frame, or reference picture, as a source of reference pixels for temporal prediction. More than two references may also be utilized, as well as units of pixels other than frames may be utilized as a source of reference pixels.

In a different aspect of the invention, an output pixel within the current macroblock B may be estimated utilizing the following equation:

$$\text{outpel } B = \text{inpel } A * W_A + \text{inpel } C * W_C + (\pm)\text{Offset,}$$

where inpel A and inpel C may be prediction pixels within macroblocks A and C, associated with prediction weighting factors $W_A$ and $W_C$, respectively. An offset value may also be utilized to estimate the output pixel within the current macroblock B. The offset value may be a non-zero value if explicit weighting prediction is utilized, and it may be equal to zero if implicit weighting prediction is utilized. If explicit weighting is utilized to predict pixels within macroblock B, weighting factors $W_A$ and $W_C$ for pixels within macroblocks A and C may be encoded within the elementary video stream, together with a corresponding offset value. Motion vector information may also be encoded within the elementary video stream to indicate the corresponding frames that may be used for temporal prediction.

If implicit weighting is utilized to predict pixels within macroblock B, only motion vector information may be encoded within the elementary video stream. Corresponding weighting factors may be generated based on the distance between the current frame and the reference frames associated with the motion vector information.

Implicit and/or explicit weighting prediction factors may be determined at various points during processing. In one exemplary embodiment of the invention, weighting factors may be determined at frame/field boundaries. Alternatively, for example, weighting factors may be determined at slice or macroblock boundaries. A set of weighting factors may, for example, be determined whenever a plurality of potential reference pictures/frames for a current picture/frame changes. In addition, weighting factors may be determined by a processor executing software instructions, by hardware, or by a combination thereof.

After prediction information, such as weighting factors, motion vectors, and/or offsets, is obtained from an elementary video stream and/or determined based on information within the elementary video stream, the prediction information for a plurality of reference pictures may be stored in a look-up table. Such weighting information may, for example, be received, determined and/or calculated in real-time. Alternatively, for example, such weighting prediction information, or various components thereof, may be pre-stored and retrieved in real-time. The look-up table may be updated or modified at various points during video information processing and in response to various events. In an exemplary scenario, where the look-up table is generated once per frame, the look-up table may be utilized during the processing of every macroblock in the frame before the look-up table is updated.

An entry in an exemplary look-up table may comprise a single weighting factor or a plurality of weighting factors, for example. In an exemplary scenario comprising only a single weighting factor per reference picture, an additional weighting factor may be determined from the single stored weighting factor. For example, in a two-reference scenario, the look-up table may comprise a first weighting factor $W_1$, and a second corresponding weighting factor may be determined to be $W_0=1-W_1$. Alternatively, a prediction weighting table may comprise weighting and/or offset information corresponding to a plurality of possible reference pictures. For example, a current macroblock may be defined by a first and second motion vector. The first motion vector may comprise information based on a first reference picture, and the second motion vector may comprise information based on a second reference picture.

FIG. 2 is a diagram illustrating an exemplary explicit prediction weighting table 200, in accordance with an embodiment of the invention. Referring to FIG. 2, the explicit prediction weighting table 200 may comprise prediction information for a plurality of reference pictures used for temporal prediction of pixels within a current frame. In addition, since two references may be used to predict a current pixel, the weighting table 200 may comprise two columns of prediction information, a "0" column and a "1" column, with prediction information for pixels in two reference pictures. For example, the explicit prediction weighting table 200 may comprise prediction information for 32 pairs of reference pictures organized in a "0" column and a "1" column, or prediction information for a total of 64 reference pictures.

In one aspect of the invention, each entry in the explicit prediction weighting table 200 may comprise 6 bytes that may be utilized, for example, to store weighting factor information $[W_{(0;i)Y}; W_{(0;i)U}; W_{(0;i)V}]$ and offset information $[S_{(0;i)Y}; S_{(0;i)U}; S_{(0;i)V}]$ for each of the luminance and chrominance components of pixels within a reference picture "i." The weighting factor information $[W_{(0;i)Y}; W_{(0;i)U}; W_{(0;i)V}]$ and offset information $[S_{(0;i)Y}; S_{(0;i)U}; S_{(0;i)V}]$ for each of the luminance and chrominance components of pixels within a reference picture "i" may be obtained from the elementary video stream and may be recorded in the explicit prediction weighting table prior to processing any pixel information. Each of the entries in the explicit prediction weighting table 200 may be indexed by the reference picture number and/or by the corresponding motion vector information obtained from the elementary video stream. After motion vector information is acquired and weighting factor information and offset information are recorded as entries in the explicit prediction weighting table 200, such prediction information may be stripped off the elementary video stream. The stripping off of the prediction information from the elementary video stream may decrease the amount of information being processed in the video decoder and, therefore, improve the processing speed and overall decoding efficiency of the video decoder.

In operation, prior to processing an elementary video stream, the explicit prediction weighting table 200 may be initially loaded with default prediction weighting and offset values. After an initial sequence of video frames and/or video slices, for example, is acquired from the elementary video stream, the explicit prediction weighting table may be generated with weighting factor and offset information acquired from the elementary video stream. After a first reference picture is determined from corresponding motion vector, information of the first reference picture, such as the reference picture number and/or a temporal distance information between the reference picture and the current picture, may be utilized as a table index to obtain weighting and/or offset information corresponding to the first reference picture from a "0" column in the explicit prediction weighting table 200. Similarly, after a second reference picture is determined from corresponding second motion vector, information pertaining to the second reference picture may be utilized to obtain weighting and/or offset information corresponding to the second reference picture from a "1" column in the explicit prediction weighting table 200. Information pertaining to the second reference picture may comprise a reference picture number and/or a temporal distance information between the reference picture and the current picture.

FIG. 3 is a diagram illustrating an exemplary implicit prediction weighting table 300, in accordance with an embodiment of the invention. Referring to FIGS. 1 and 3, the implicit prediction weighting table 300 may comprise prediction information for a plurality of reference pictures used for temporal prediction of pixels within a current frame. For example, pixels within a current macroblock B in a current picture 2 of FIG. 1 may be estimated utilizing prediction pixels within a previous macroblock A in reference picture 0 and pixels within a subsequent macroblock C in reference picture 5. Weighting factors for pixels within macroblocks A and C may be implicitly encoded within the elementary video stream.

In operation, a video decoder may acquire motion vector information associated with reference pictures 0 and 5. Temporal distances, such as distances D1 and D2 in FIG. 1, may then be generated based on the acquired motion vector information. The motion vector information and the temporal distance information may be utilized by the video decoder to generate the implicit prediction weighting table 300 of FIG. 3. Entries within the implicit prediction weighting table 300 may be separated into a "0" column and a "1" column based on the direction of a corresponding motion vector between a current picture and a reference picture. For example, the first row in the implicit prediction weighting table 300 may be utilized to store weighting factors for reference picture 0 depending on whether a motion vector designates temporal movement direction from reference picture 0 to current picture 2, reflected in column "0," or temporal movement direction from current picture 2 to reference picture 0, reflected in column "1." In this manner, the implicit prediction weighting table 300 may be order-dependent so that a table entry, or weighting factor, $W_{(0;\ 3)}$ corresponding to indices (2:3) does not necessarily contain the same information as weighting factor $W_{(1;\ 3)}$ corresponding to indices (3:2). A first table index, therefore, may correspond to a temporally preceding picture reference and a second successive table index may correspond to a temporally succeeding picture reference.

In one aspect of the invention, a video decoder may acquire motion vector information from an elementary video stream and may generate an implicit prediction weighting table for a total of n reference pictures, as illustrated in FIG. 3. The generated implicit prediction weighting table may be utilized to provide weighting factor information for a specific macroblock, frame and/or slice. Entries within the generated implicit prediction weighting table, similarly to entries in the explicit prediction weighting table may be updated on the fly or after decoding a determined number of frames and/or video slices.

A decoder utilizing motion compensation with weighted prediction may utilize prediction information within an elementary video stream and generate an explicit or implicit prediction weighting table that may be used to decode subsequent video frames and/or slices. Memory within the decoder, such as on-chip RAM, may be efficiently utilized for storing either an explicit or implicit prediction weighting table, depending on whether prediction information is explicitly or implicitly encoded within the elementary video stream.

After a prediction weighting table is generated with weighting factor and/or offset entries for specific reference pictures, pixels within a current macroblock or a current frame, for example, may be estimated utilizing pixels within previous and/or subsequent macroblocks and/or frames. In an exemplary aspect of the invention, the incoming elementary video stream may comprise weighting and/or offset information corresponding to a video slice. A video decoder may receive such information and may process the received information and place such information in a weighting table. Subsequent processing may then process blocks and sub-blocks within the slice by utilizing table information for the slice. The table may, for example, comprise weighting and/or offset information corresponding to various reference pictures. Prediction information within an explicit and/or implicit weighting information table may be updated at different intervals. For example, weighting information tables may be updated after a determined number of frames and/or a determined number of video slices. The present invention is not limited by the number of weighting factors that may be stored within an implicit and/or explicit prediction weighting table, nor is the present invention limited by the frequency at which the implicit or explicit prediction weighting table may be updated during decoding.

Figure 4:
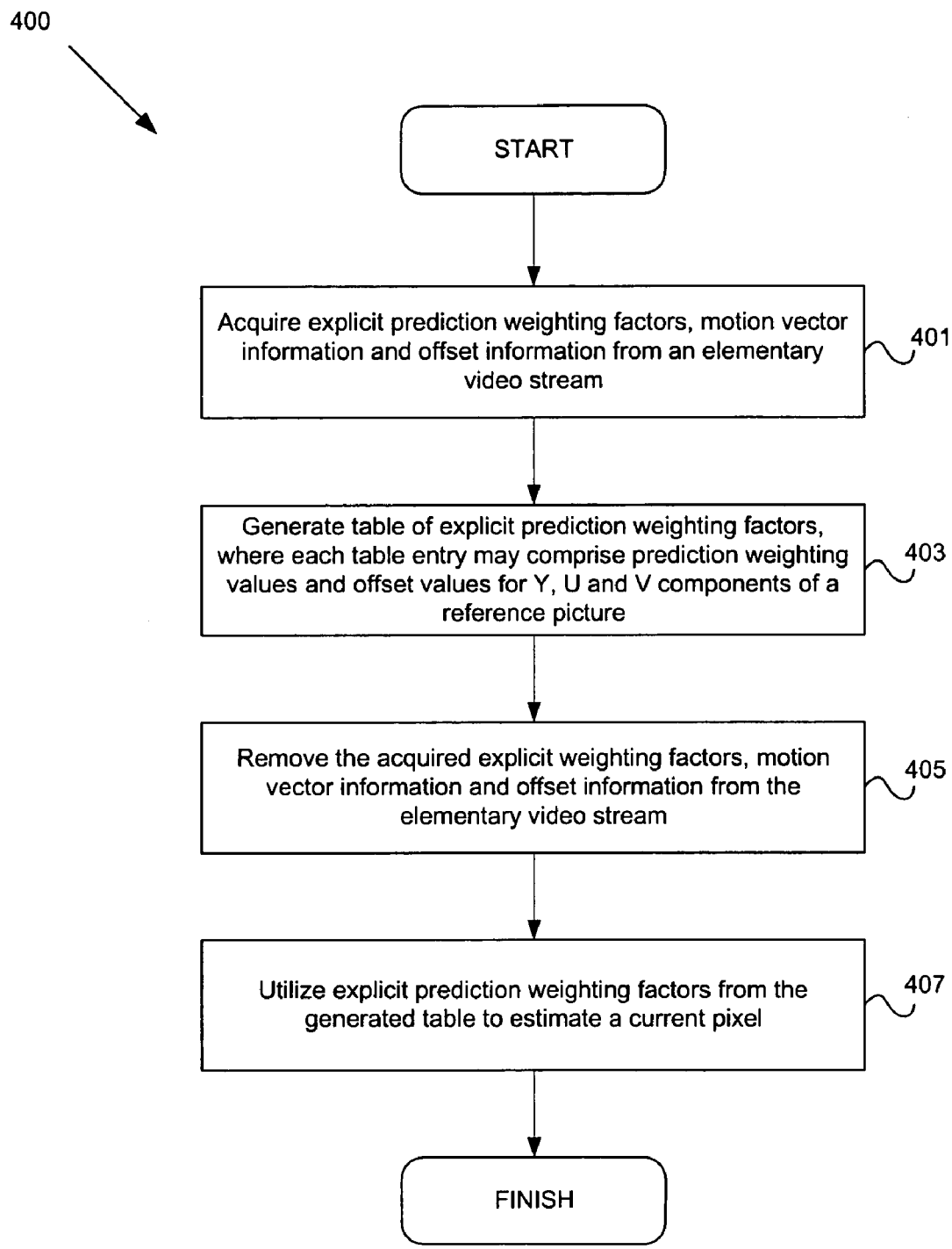
FIG. 4 is a flow diagram illustrating an exemplary method for implementing an explicit prediction weighting table, in accordance with an embodiment of the invention.

FIG. 4 is a flow diagram illustrating an exemplary method 400 for implementing an explicit prediction weighting table, in accordance with an embodiment of the invention. At 401, explicit prediction weighting factors, motion vector information and offset information may be acquired from an elementary video stream. At 403, a table of explicit prediction weighting factors may be generated, where each table entry may comprise prediction weighting values and offset values for luminance and chrominance pixel components of a reference picture. At 405, the acquired explicit weighting factors, motion vector information and offset information may be removed from the elementary video stream. At 407, the explicit prediction weighting factors from the generated table may be utilized to estimate a current pixel.

Figure 5:
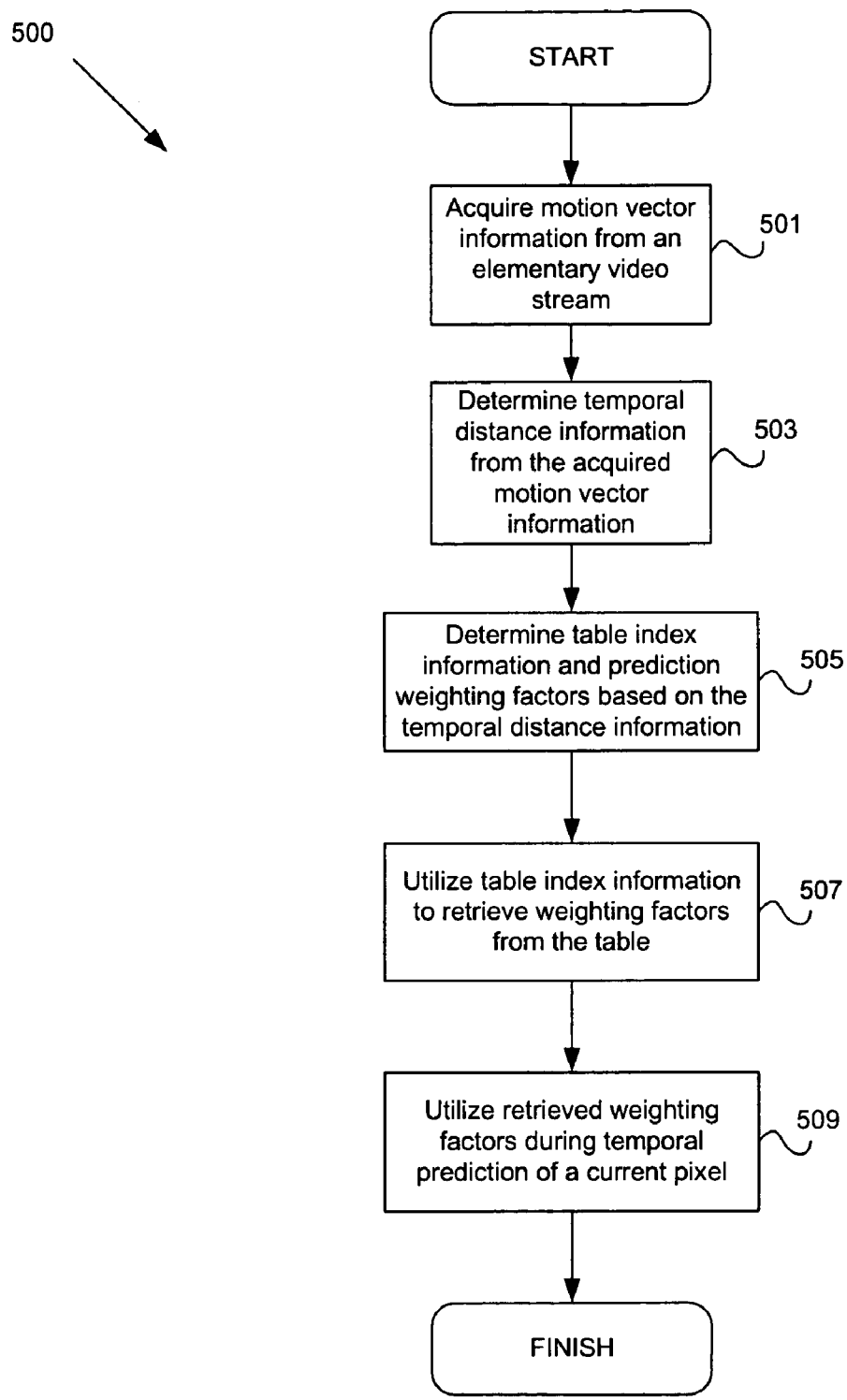
FIG. 5 is a flow diagram illustrating an exemplary method for implementing an implicit prediction weighting table, in accordance with an embodiment of the invention.

FIG. 5 is a flow diagram illustrating an exemplary method 500 for implementing an implicit prediction weighting table, in accordance with an embodiment of the invention. At 501, motion vector information may be acquired from an elementary video stream. At 503, temporal distance information between a current frame and a reference frame, or picture, may be determined from the acquired motion vector information. At 505, table index information and prediction weighting factors may be determined based on the temporal distance information. At 507, table index information may be utilized to retrieve weighting factors from the table. At 509, the retrieved weighting factors may be utilized during temporal prediction of a current pixel.

Figure 6:
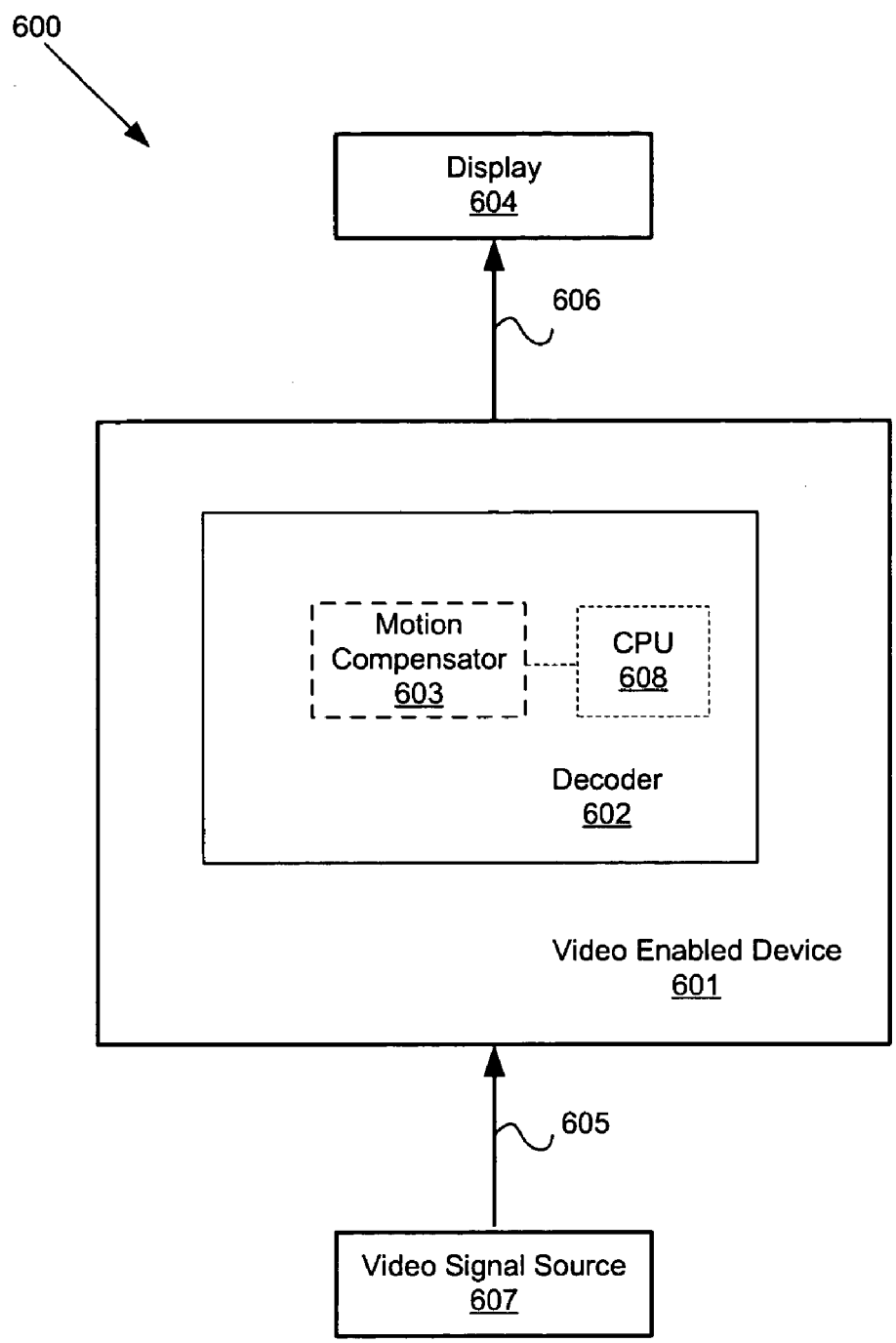
FIG. 6 is a block diagram illustrating an exemplary system for video decoding utilizing motion compensation with weighted prediction, in accordance with an embodiment of the invention.

FIG. 6 is a block diagram illustrating an exemplary system 600 for video decoding utilizing motion compensation with weighted prediction, in accordance with an embodiment of the invention. Referring to FIG. 6, the video signal processing system 600 may comprise a video signal source 607, a video enabled device 601 and a display 604.

The video signal source 607 may comprise a video encoder and may be adapted to generate an elementary video stream 605. The video signal source 607 may utilize one or more video encoding standards, such as MPEG-4, for example, and may be implemented as a video head end, for example. The video signal source 607 may communicate the elementary video stream 605 to the video enabled device 601 for further processing, including decoding of the elementary video stream 605. The video signal source 607 may be connected to the video enabled device 601 via a wired and/or a wireless connection.

The video enabled device 601 comprises suitable circuitry, logic and/or code and may be adapted to process an elementary video stream 605. For example, the video enabled device 601 may comprise a decoder 602 and may be adapted to decode the elementary video signal 605 to generate a decoded video signal 606. The video enabled device 601 may be implemented as a cable set top box, a satellite receiver box, a hand held device such as a PDA and/or cellular phone, a computer, and/or a digital antenna tuner, for example.

In one aspect of the invention, the video enabled device 601 may comprise a decoder 602. The decoder 602 may be adapted to decode the elementary video stream 605 utilizing a motion compensator 603. The motion compensator 603 may be adapted to acquire temporally encoded prediction information, such as motion vector information, weighting factors and/or offset information that may be utilized by a central processing unit (CPU) 608 to predict pixels within a current macroblock. The CPU 608 may predict pixels within a current macroblock utilizing the acquired prediction information and pixels within a previous and/or a subsequent reference picture.

After the elementary video stream 605 is decoded, the decoded video signal 606 may be communicated to a display 604 for further processing. The display 604 may be implemented within a television or other video screen, for example, and may be adapted to display the decoded video signal 606.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

Various functional aspects of the present invention may be performed by a processor executing software instructions, by hardware, or by a combination thereof. The explicit and/or implicit prediction weighting tables may, for example, be implemented in various memory types, including but not limited to, on-chip and/or off-chip memory, local and/or non-local memory, SRAM and/or DRAM, volatile and/or non-volatile memory, etc. Further, various table implementations may be mirrored between various memory modules. For example, various table portions may be maintained in relatively low-speed memory and may be loaded into relatively high-speed memory for utilization. Additionally, for example, a first type of prediction weighting table may be implemented in a first memory module for a first type of elementary video stream, and a second type of prediction weighting table may be implemented in the first memory module for a second type of elementary video stream, such as in overlapping memory spaces or in separate memory spaces. Accordingly, the scope of various aspects of the present invention should not be limited by characteristics of particular software and/or hardware implementations.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing pixels within an encoded video stream, the method comprising:
acquiring on a chip, a prediction weight type from the encoded video stream;
acquiring on said chip, prediction weight data for at least one prediction pixel within the encoded video stream based on said acquired prediction weight type;

generating on said chip, at least one look-up table entry in a look-up table for said at least one prediction pixel utilizing said acquired prediction weight data; and estimating on said chip, at least a portion of a plurality of current pixels within the encoded video stream utilizing said generated at least one look-up table entry.

2. The method according to claim 1, wherein said prediction weight type corresponds to a plurality of reference pictures within the encoded video stream.

3. The method according to claim 1, comprising acquiring on said chip, at least one prediction weight value, offset value and motion vector data for said at least one prediction pixel, if said prediction weight type comprises an explicit prediction weight type.

4. The method according to claim 3, comprising generating on said chip, said at least one look-up table entry utilizing said at least one prediction weight value and offset value for said at least one prediction pixel.

5. The method according to claim 4, wherein said generated at least one look-up table entry corresponds to one or both of luminance and/or chrominance components of said at least one prediction pixel.

6. The method according to claim 4, comprising indexing said at least one look-up table entry utilizing said motion vector data.

7. The method according to claim 6, comprising estimating on said chip, said at least a portion of said plurality of current pixels utilizing said indexed at least one look-up table entry.

8. The method according to claim 3, comprising stripping off said acquired motion vector data, prediction weight value and offset value from the encoded video stream.

9. The method according to claim 1, comprising acquiring on said chip, motion vector data for said at least one prediction pixel, if said prediction weight type comprises an implicit prediction weight type.

10. The method according to claim 9, comprising generating on said chip, at least one prediction weight value for said at least one prediction pixel.

11. The method according to claim 10, wherein said generated at least one prediction weight value is based on at least one temporal distance between portions of a plurality of pixels within the encoded video stream.

12. The method according to claim 10, comprising generating on said chip, said at least one look-up table entry utilizing said generated at least one prediction weight value.

13. The method according to claim 12, comprising estimating on said chip, said at least a portion of said plurality of current pixels utilizing said generated at least one look-up table entry.

14. A computer-readable medium encoded with computer executable instructions for processing pixels within an encoded video stream to perform the steps comprising:

acquiring on a chip, a prediction weight type from the encoded video stream;

acquiring on said chip, prediction weight data for at least one prediction pixel within the encoded video stream based on said acquired prediction weight type;

generating on said chip, at least one look-up table entry in a look-up table for said at least one prediction pixel utilizing said acquired prediction weight data; and estimating on said chip, at least a portion of a plurality of current pixels within the encoded video stream utilizing said generated at least one look-up table entry.

15. The computer-readable medium according to claim 14, wherein said prediction weight type corresponds to a plurality of reference pictures within the encoded video stream.

16. The computer-readable medium according to claim 14, comprising code for acquiring on said chip, at least one prediction weight value, offset value and motion vector data for said at least one prediction pixel, if said prediction weight type comprises an explicit prediction weight type.

17. The computer-readable medium according to claim 16, comprising code for generating on said chip, said at least one look-up table entry utilizing said at least one prediction weight value and offset value for said at least one prediction pixel.

18. The computer-readable medium according to claim 17, wherein said generated at least one look-up table entry corresponds to one or both of luminance and/or chrominance components of said at least one prediction pixel.

19. The computer-readable medium according to claim 17, comprising code for indexing said at least one look-up table entry utilizing said motion vector data.

20. The computer-readable medium according to claim 19, comprising code for estimating on said chip, said at least a portion of said plurality of current pixels utilizing said indexed at least one look-up table entry.

21. The computer-readable medium according to claim 16, comprising code for stripping off said acquired motion vector data, prediction weight value and offset value from the encoded video stream.

22. The computer-readable medium according to claim 14, comprising code for acquiring on said chip, motion vector data for said at least one prediction pixel, if said prediction weight type comprises an implicit prediction weight type.

23. The computer-readable medium according to claim 22, comprising code for generating on said chip, at least one prediction weight value for said at least one prediction pixel.

24. The computer-readable medium according to claim 23, wherein said generated at least one prediction weight value is based on at least one temporal distance between portions of a plurality of pixels within the encoded video stream.

25. The computer-readable medium according to claim 23, comprising code for generating on said chip, said at least one look-up table entry utilizing said generated at least one prediction weight value.

26. The computer-readable medium according to claim 25 comprising code for estimating on said chip, said at least a portion of said plurality of current pixels utilizing said generated at least one look-up table entry.

27. A system for processing pixels within an encoded video stream, the system comprising:

at least one processor implemented on a chip that acquires on said chip, a prediction weight type from the encoded video stream;

said at least one processor acquires on said chip, prediction weight data for at least one prediction pixel within the encoded video stream based on said acquired prediction weight type;

said at least one processor generates on said chip, at least one look-up table entry in a look-up table for said at least one prediction pixel utilizing said acquired prediction weight data; and said at least one processor estimates on said chip, at least a portion of a plurality of current pixels within the encoded video stream utilizing said generated at least one look-up table entry.

28. The system according to claim 27, wherein said prediction weight type corresponds to a plurality of reference pictures within the encoded video stream.

29. The system according to claim 27, wherein said at least one processor acquires on said chip, at least one prediction weight value, offset value and motion vector data for said at least one prediction pixel, if said prediction weight type comprises an explicit prediction weight type.

30. The system according to claim 29, wherein said at least one processor generates on said chip, said at least one look-up table entry utilizing said at least one prediction weight value and offset value for said at least one prediction pixel.

31. The system according to claim 30, wherein said generated at least one look-up table entry corresponds to one or both of luminance and/or chrominance components of said at least one prediction pixel.

32. The system according to claim 30, wherein said at least one processor indexes said at least one look-up table entry utilizing said motion vector data.

33. The system according to claim 32, wherein said at least one processor estimates on said chip, said at least a portion of said plurality of current pixels utilizing said indexed at least one look-up table entry.

34. The system according to claim 29, wherein said at least one processor strips off said acquired motion vector data, prediction weight value and offset value from the encoded video stream.

35. The system according to claim 27, wherein said at least one processor acquires on said chip, motion vector data for said at least one prediction pixel, if said prediction weight type comprises an implicit prediction weight type.

36. The system according to claim 35, wherein said at least one processor generates on said chip, at least one prediction weight value for said at least one prediction pixel.

37. The system according to claim 36, wherein said generated at least one prediction weight value is based on at least one temporal distance between portions of a plurality of pixels within the encoded video stream.

38. The system according to claim 36, wherein said at least one processor generates on said chip, said at least one look-up table entry utilizing said generated at least one prediction weight value.

39. The system according to claim 38, wherein said at least one processor estimates on said chip, said at least a portion of said plurality of current pixels utilizing said generated at least one look-up table entry.

* * * * *

UNITED STATES PATENT AND TRADEMARK OFFICE
CERTIFICATE OF CORRECTION

| | | |
|---|---|---|
| PATENT NO. | : 7,515,637 B2 | Page 1 of 1 |
| APPLICATION NO. | : 10/974179 | |
| DATED | : April 7, 2009 | |
| INVENTOR(S) | : Christopher Payson | |

It is certified that error appears in the above-identified patent and that said Letters Patent is hereby corrected as shown below:

On the Title page, at Item (73), Assignee, please delete "Broadcom Advanced Compression Group, LLC, Andover, MA (US)" and insert --Broadcom Corporation, Irvine, CA (US)--

Signed and Sealed this

Nineteenth Day of May, 2009

JOHN DOLL
*Acting Director of the United States Patent and Trademark Office*